US007035032B2

(12) United States Patent
Tanner

(10) Patent No.: US 7,035,032 B2
(45) Date of Patent: Apr. 25, 2006

(54) METHOD AND SYSTEM FOR REDUCING POWER CONSUMPTION IN A ROTATABLE MEDIA DATA STORAGE DEVICE

(75) Inventor: Brian K. Tanner, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 216 days.

(21) Appl. No.: 10/623,874

(22) Filed: Jul. 21, 2003

(65) Prior Publication Data

US 2005/0018340 A1    Jan. 27, 2005

(51) Int. Cl.
*G11B 15/18*    (2006.01)
(52) U.S. Cl. ...................................................... 360/69
(58) Field of Classification Search ................. 360/69, 360/73.03, 72.1, 75, 78.09, 78.12, 78.04, 360/78.06; 330/251; 318/560, 254, 563; 363/132, 98; 388/801
See application file for complete search history.

(56) References Cited

U.S. PATENT DOCUMENTS

| | | | | |
|---|---|---|---|---|
| 5,001,578 A | * | 3/1991 | Yamauchi | 360/73.03 |
| 5,204,593 A | * | 4/1993 | Ueki | 318/254 |
| 5,384,524 A | * | 1/1995 | Romano | 318/569 |
| 5,455,496 A | * | 10/1995 | Williams et al. | 318/563 |
| 5,631,817 A | * | 5/1997 | Minami | 363/98 |
| 5,801,894 A | * | 9/1998 | Boutaghou et al. | 360/72.1 |
| 5,838,515 A | * | 11/1998 | Mortazavi et al. | 360/78.12 |
| 5,917,720 A | * | 6/1999 | Galbiati | 363/98 |
| 6,097,565 A | * | 8/2000 | Sri-Jayantha et al. | 360/78.09 |
| 6,108,157 A | * | 8/2000 | Yoneda et al. | 360/75 |
| 6,236,527 B1 | * | 5/2001 | Uchiike et al. | 360/75 |
| 6,285,521 B1 | * | 9/2001 | Hussein | 360/73.03 |
| 6,374,043 B1 | * | 4/2002 | El-Sherif et al. | 388/801 |
| 6,512,650 B1 | * | 1/2003 | Tanner | 360/75 |
| 6,617,817 B1 | * | 9/2003 | Hill | 318/560 |
| 6,717,763 B1 | * | 4/2004 | Ottesen et al. | 360/75 |
| 6,727,752 B1 | * | 4/2004 | Skinner et al. | 330/251 |
| 6,747,838 B1 | * | 6/2004 | Korbel et al. | 360/78.06 |
| 6,757,129 B1 | * | 6/2004 | Kuroiwa et al. | 360/78.04 |
| 6,762,901 B1 | * | 7/2004 | Hill | 360/78.04 |
| 6,804,131 B1 | * | 10/2004 | Galbiati et al. | 363/132 |
| 6,819,072 B1 | * | 11/2004 | White et al. | 318/560 |

OTHER PUBLICATIONS

U.S. Appl. No. 10/623,673, filed Jul. 21, 2003, Brian K. Tanner.

* cited by examiner

*Primary Examiner*—David Hudspeth
*Assistant Examiner*—Fred F. Tzeng
(74) *Attorney, Agent, or Firm*—Fliesler Meyer LLP

(57) ABSTRACT

Methods and systems in accordance with embodiments of the present invention can provide for reduced power consumption in rotatable media data storage devices. A voice coil motor driver configured to operate as a linear driver can be operated in a quasi-switch mode, for example when idle, or linear mode, for example during read/write operations and seeks, thereby achieving power savings along with accurate current control. Alternatively, a voice coil motor driver configured to operate as a switched driver can be operated at a reduced limit cycle, for example when idle, or a higher limit cycle, for example during read/write operations and seeks, thereby achieving power savings.

7 Claims, 3 Drawing Sheets

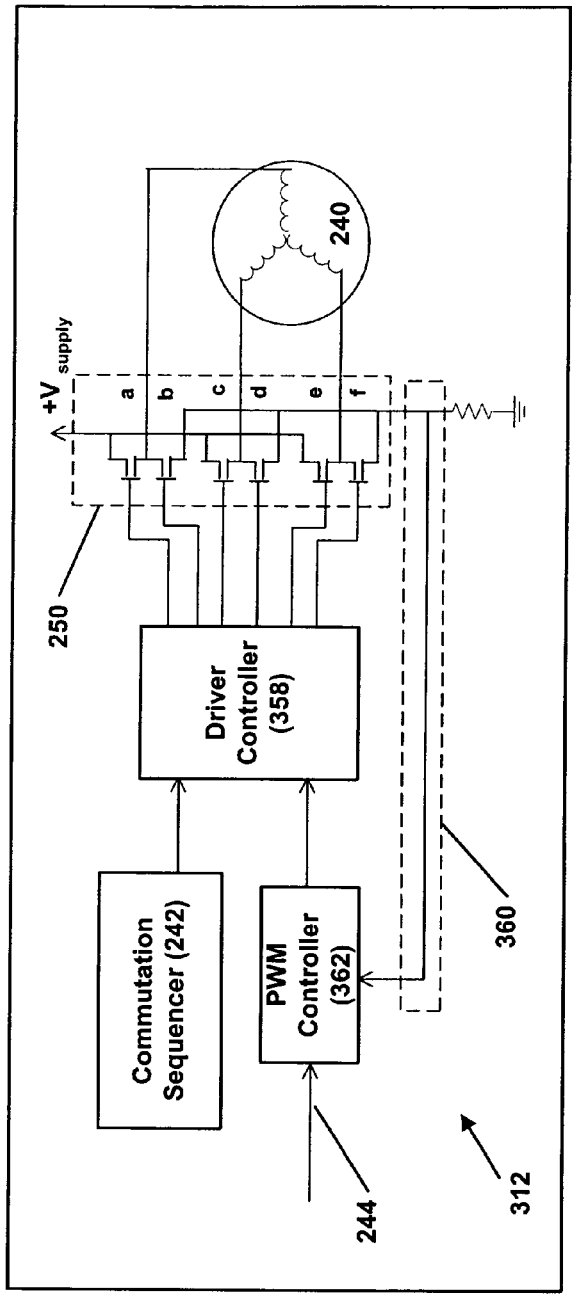
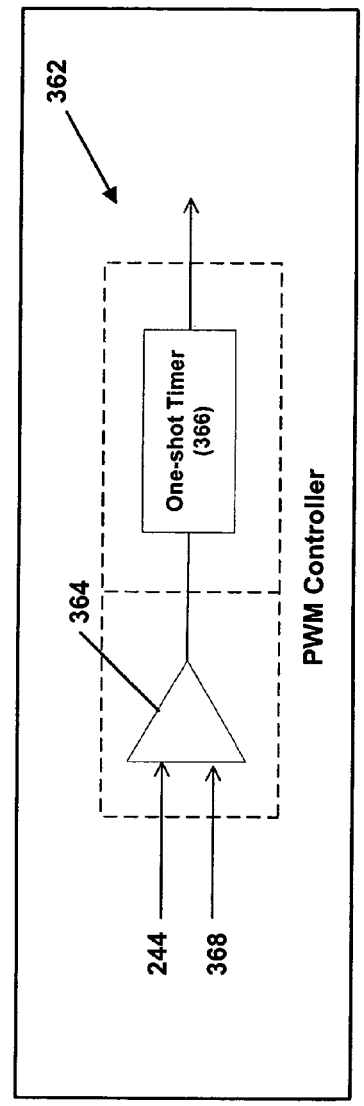
FIG. 3A
FIG. 3B

METHOD AND SYSTEM FOR REDUCING POWER CONSUMPTION IN A ROTATABLE MEDIA DATA STORAGE DEVICE

TECHNICAL FIELD

The present invention relates to rotatable media data storage devices, as for example magnetic or optical hard disk drive technology, and power consumption of rotatable media data storage devices.

BACKGROUND

Over the past few years, notebook computers have become progressively thinner and lighter, and battery technology has improved significantly; but, though both thinner and lighter, notebook computers have incorporated evermore powerful CPU's, larger and higher resolution screens, more memory and higher capacity hard disk drives. Feature-rich models include a number of peripherals such as high-speed CD-ROM drives, DVD drives, fax/modem capability, and a multitude of different plug-in PC cards. Each of these features and improvements creates demand for power from system batteries. Many portable electronics, such as MP3 players and personal digital assistants, now use rotatable data storage devices as well, and by their nature and size place great demands for power on batteries.

Many manufacturers of rotatable data storage devices reduce demand on batteries by employing power savings schemes; for example, many manufacturers ramp down and stop a rotating storage medium after a period of inactivity. This scheme comes at a cost to performance—the medium must be spun up from standstill before information can be accessed from the medium.

SUMMARY

An embodiment of a system and method in accordance with the present invention can provide for reduced power consumption in a rotatable media data storage device. A voice coil motor driver configured to operate as a linear driver can be operated in a quasi-switch mode, for example when idle, or linear mode, for example during read/write operation and seeks, thereby achieving power savings along with accurate current control. In an alternative embodiment, a voice coil motor driver configure to operate as a switched driver can be operated at a reduced limit cycle, for example when idle, or a higher limit cycle, for example during read/write operations and seeks, thereby achieving power savings.

BRIEF DESCRIPTION OF THE FIGURES

Further details of embodiments of the present invention are explained with the help of the attached drawings in which:

FIG. 3A is a schematic of a switch mode spindle motor driver used in the typical hard disk drive of FIG. 1; and FIG. 3B is a schematic of a pulse width modulation (PWM) controller used in the spindle motor driver of FIG. 3A.

DETAILED DESCRIPTION

Figure 1:
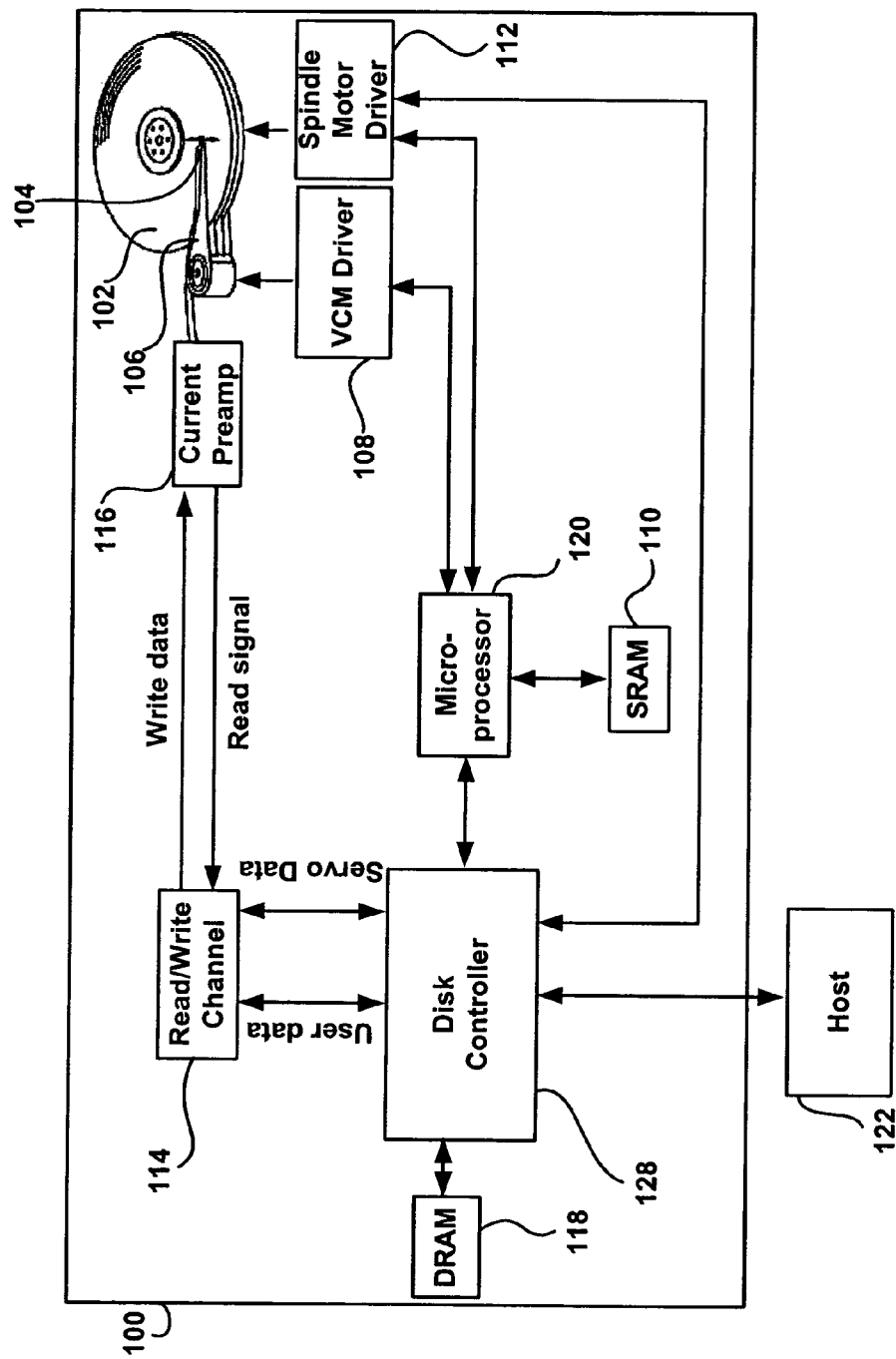
FIG. 1 is a control schematic of a typical hard disk drive for applying a method in accordance with one embodiment of the present invention.

Methods and systems in accordance with embodiments of the present invention can provide for reduced power consumption in rotatable media data storage devices. FIG. 1 is a control schematic of a typical hard disk drive 100 for applying a method in accordance with one embodiment of the present invention. The hard disk drive 100 includes at least one rotatable data storage medium 102 capable of storing information on at least one surface. Numbers of disks and surfaces can vary by hard disk drive. In a magnetic hard disk drive as described below, the at least one storage medium 102 is a magnetic disk. A closed loop servo system can include a rotary actuator having an arm 106 for positioning a head 104 over selected tracks of the disk 102 for reading or writing, or for moving the head 104 to a selected track during a seek operation. In one embodiment, the head 104 is a magnetic transducer adapted to read data from and write data to the disk 102. In another embodiment, the head 104 includes separate read elements and write elements. The separate read element can be a magneto-resistive head 104, also known as an MR head 104. It will be understood that multiple head 104 configurations can be used.

The servo system can include a driver for driving a voice coil motor (VCM) 108 for rotating the actuator arm 106, a driver for driving a spindle motor 112 for rotating the disk(s) 102, a microprocessor 120 for controlling the VCM driver 108 and the spindle motor driver 112, and a disk controller 128 for receiving information from a host 122 and for controlling many disk functions. A host can be any device, apparatus, or system capable of utilizing the data storage device, such as a personal computer or Web server. In some embodiments, the disk controller 128 can include an interface controller for communicating with a host 122, while in other embodiments a separate interface controller can be used. The microprocessor 120 can also include a servo controller, which can exist as circuitry within the hard disk drive 100 or as an algorithm resident in the microprocessor 120, or as a combination thereof. In other embodiments, an independent servo controller can be used. In still other embodiments, the servo controller, VCM driver 108, and spindle motor driver 112 can be integrated into a single application specific integrated circuit (ASIC). One of ordinary skill in the art can appreciate the different means for controlling the spindle motor and the VCM.

The microprocessor 120 can include integrated memory (such as cache memory), or the microprocessor 120 can be electrically connected with external memory (for example, static random access memory (SRAM) 110 or alternatively dynamic random access memory (DRAM)). The disk controller 128 provides user data to a read/write channel 114, which sends signals to a current amplifier or preamp 116 to be written to the disk(s) 102. The disk controller 128 can also send servo signals to the microprocessor 120. A disk controller 128 can include a memory controller for interfacing with buffer memory 118. In one embodiment, the buffer memory 118 can be DRAM.

The microprocessor 120 can command current from the spindle motor driver 112 to drive the spindle motor, thereby rotating the disk(s) 102. A control structure of the spindle motor driver 112 is typically configured to operate exclusively in either linear mode or switch mode to provide the commanded current to windings of the spindle motor. A similar driver stage can be used for spindle motor drivers 112 having either a linear mode or a switch mode configuration. A pre-driver stage control structure determines whether the instantaneous current is driven to a specific target (as in linear mode) or the instantaneous current is driven in a limit cycle where the average current value is approximately the specific target value with controlled maximum peak current values (as in switch mode).

Figure 2:
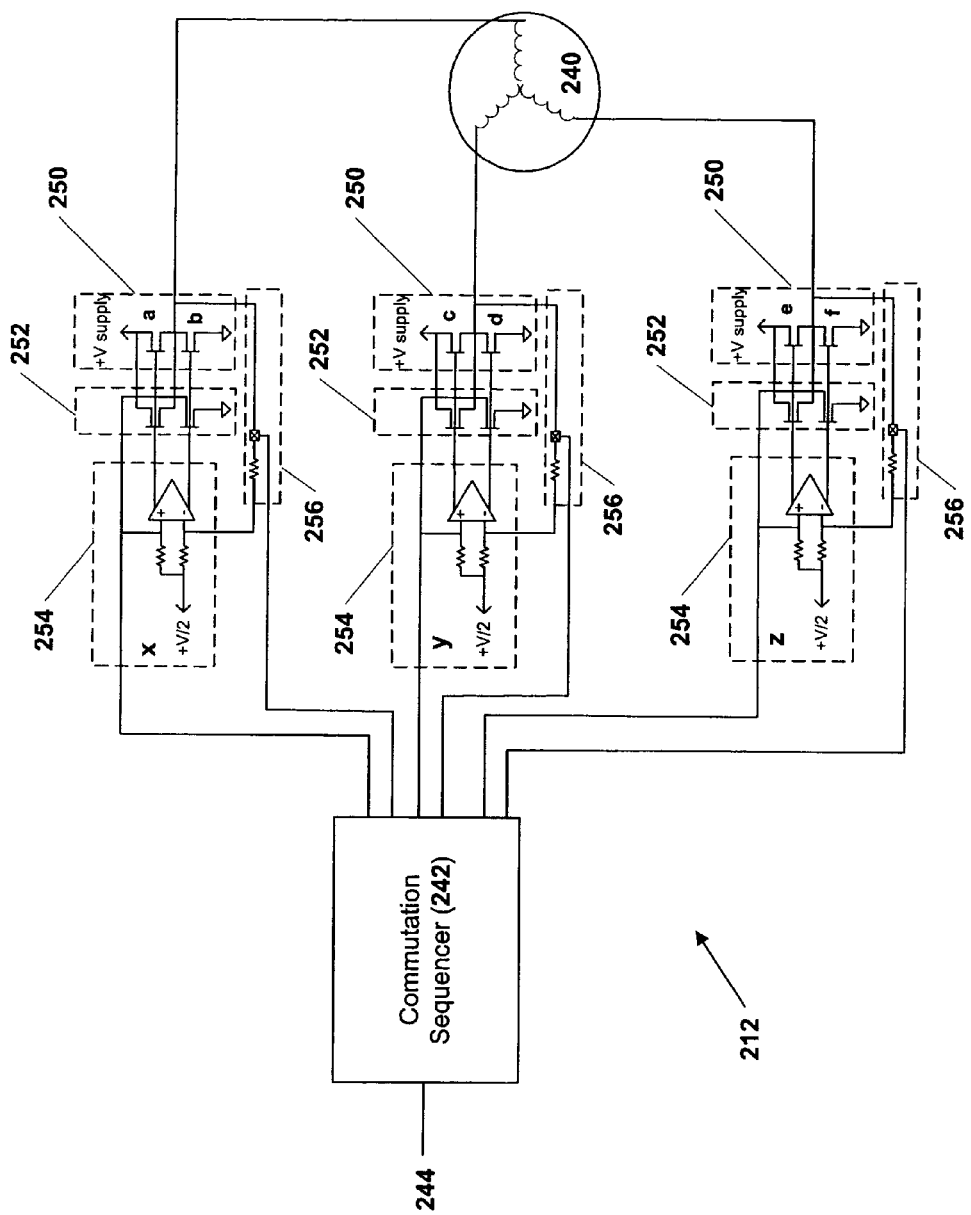
FIG. 2 is a schematic of a linear mode spindle motor driver used in the typical hard disk drive of FIG. 1.

FIG. 2 is a simplified schematic of a portion of one example of a spindle motor driver 112 configured to operate in linear mode (hereafter called a linear mode driver) 212, showing exemplary elements for providing current to the spindle windings 240 including the driver stage 250, a commutation sequencer 242, an operational amplifier stage 254, a current feedback stage 252, and a voltage centering bias structure 256. As mentioned above, a similar driver stage 250 can be used for either the linear mode driver or a spindle motor driver 112 configured to operate in switch mode (hereafter called a switch mode driver), and in this example is shown to comprise a MOSFET triplet "H-bridge". Alternatively, the driver stage 250 can comprise a number of different components fabricated using a number of different manufacturing techniques. One of ordinary skill in the art can appreciate the different configurations for the driver stage.

Immediately preceding the driver stage 250 in the linear mode driver is the current feedback stage 252 where the current in each individual MOSFET transistor 250a–f is controlled via a current mirror control structure 252a–f.

The stage preceding the current feedback stage 252 is the operational amplifier stage 254, typically only implemented in a linear mode driver. The output of an operational amplifier 254x–z is a signal targeting a continuous current value. Each operational amplifier 254x–z generates a pair of voltages for each phase winding that are applied to current mirror transistors 252a–f in the current feedback stage 252 for control of driver stage transistor current. The input to the operational amplifier stage 254 can be controlled by a switch 256 associated with the commutation sequencer 242 that typically guides the commanded current signals 244 to two of the three operational amplifiers 254x–z in the operational amplifier stage 254 to enable current flow in two of the three windings 240, thereby maximizing the peak positive torque produced by the spindle motor. The commutation sequencer 242 sequences through commutation states, which can correspond to sets of torque curves representing the functional relationship between torque, current flow and angular position.

The voltage centering bias structure 256 is selectively multiplexed (via a switch) to active transistor pairs (e.g. 250a and 250b) to center the output voltage of the driven windings to the power supply voltage and to keep the output impedance of the undriven transistor pair high. This balances the power dissipation in the driver stage 250 evenly between the upper and lower FET transistors in each transistor pair.

The schematic shown in FIG. 2 is merely one example of a schematic for a linear mode driver. A linear mode driver can include additional or fewer elements, while achieving similar results. One of ordinary skill in the art can appreciate the different configurations for achieving current control.

FIG. 3A is a simplified schematic of a portion of one example of a switch mode driver 312, showing exemplary elements for providing power to the spindle windings 240, including the driver stage 250, a commutation sequencer 242, a pulse width modulation (PWM) controller 362, a driver controller 358, and a current feedback loop 360. The output of the driver controller 358 is a state where the individual transistors 250a–f are either fully turned on (saturated) or fully turned off, rather than a continuous current value.

As with the linear mode driver 212, commutation states can correspond to a set of torque curves. The commutation sequencer 242 sequences through the commutation states to control switching elements 250a–f that drive the spindle motor to maximize the peak positive torque produced by the spindle motor. The commutation sequencer 242 switches on two power transistors 250a–f on opposite legs of windings 240 during each of the commutation states (via driver controller 358). Thus, there is one floating winding for the spindle motor during each of the commutation states.

The PWM controller 362 monitors the instantaneous current flow in the driver stage 250 and when the current builds up to a value greater than a programmable threshold the PWM controller 362 overrides the commutation sequencer 242 and the driver stage 250 is turned off via the driver controller 358. In this way, the maximum current in the limit cycle profile of the spindle current is very well controlled. Maximum current control is used to control the average value of the spindle current, and by extension to control the speed of the spindle.

FIG. 3B illustrates in greater detail components that comprise the PWM controller 362. The PWM controller 362 comprises a voltage comparator 364 and a one-shot timer 366. The one-shot timer 366 allows current flow 368 in the spindle windings to increase at a rate limited by the inductance of the spindle winding 240. When the current 368 in the spindle winding increases above the command current threshold, the voltage comparator 364 is tripped, setting the one-shot timer 366. When the one-shot timer 366 is set, the driver stage transistors 250a–f are disabled, causing the current 368 in the spindle winding to drop below the command current threshold. When the one-shot timer 366 times out, the voltage comparator 364 has cleared (i.e. is no longer in a "tripped" state), and the process is repeated, causing a limit cycle in the spindle current with well controlled maximum current peaks. In other embodiments, the one-shot timer 366 can control minimum current dips rather than maximum current peaks by enabling the driver stage transistors 250a–f when the current drops below a minimum current dip. One of ordinary skill in the art can appreciate the different methods by which a limit cycle can be controlled.

In principle, a switch mode driver is a very efficient driver. By continually shorting the power supply across the load, a relatively precise current having a saw-tooth pattern can be obtained. Typically, faster switching produces smaller saw-tooths, resulting in a smoother overall current plot. A switch mode driver 312 having no resistance dissipates no power and all power losses are across the load (the spindle). In reality, there are some power losses associated with switching due to resistance in the switch mode driver 312 and per-switch energy dissipation, but typically the switch mode driver 312 dissipates less power than a linear mode driver 212. Inaccuracies in the one-shot time value and/or noise in the current feedback signal can result in substantial deviations in the instantaneous current values that are not repeatable. These inaccuracies are commonly minimized in a switch mode driver 312 by switching at a very high frequency, providing more accurate control over the current delivered to the load but at the same time as the frequency of switching increases, switching losses increase and the power dissipated in the switch mode driver 312 increases. Further, electrical interference can be generated by switching, potentially interfering with the heads 104 during seeks and read/write operations.

The schematics shown in FIGS. 3A and B are merely examples of switch mode driver configurations. One of ordinary skill in the art can appreciate the different configurations for achieving current control.

In one embodiment, a method in accordance with the present invention can be used to achieve power savings comparable with switch mode drivers, for example when idle, and achieve current control associated with linear mode drivers, for example during read/write operations and seeks. The method can be applied to a hard disk drive 100 configured with a linear mode driver 212 (as shown in FIG. 2). The method comprises a low power mode activated when the head 104 is idle; that is, not reading or writing to or from the medium. In a low power mode, the microprocessor 120 commands a grossly exaggerated current 244 from the linear mode driver 212, saturating the operational amplifier stage 254. At some time interval later, the microprocessor 120 "turns off" the driver stage 250 by commanding zero current from the operational amplifier stage 254. The microprocessor 120 alternates between saturating the operational amplifier stage 254 and turning the driver stage 250 off at a limit cycle. When the head 104 receives a command, the hard disk drive 100 returns to linear mode and the operational amplifier stage 254 is commanded to a current for achieving a target spindle speed.

During low power mode, the linear mode driver 212 can resemble a switch mode driver 312. However, the linear mode driver 212 typically has a continuous current feedback loop coupled to each individual output transistor (the current mirror stage 252) and does not include a single current feedback loop 360. The limit cycle for the linear mode driver 212 can be based on a back EMF voltage detector (not shown). The microprocessor 120 can use timing pulses from the back EMF voltage detector to create control signals defining the limit cycle. The limit cycle for low power mode typically provides coarser current control. Beneficially, this can result in lower power losses attributable to switching. By applying the method, the hard disk drive can reduce the power consumed by the spindle motor driver 112 during periods when possible electrical interference from changes in current and/or imprecise spindle speed control do not interfere with the operation of the hard disk drive 100.

A system for applying the method in accordance with one embodiment of the present invention can include the hard disk drive 100 described above including read-only memory (ROM) for storing firmware adapted to generate commands for current from the linear mode driver 212 such that the linear mode driver 212 can operate in low power mode. In a run mode of operation, either the microprocessor 120 or the disk controller 128 controls all of the spindle functions except the function of flagging the disk controller 128 to the existence of a spindle speed fault. For operations other than run mode (i.e. alignment, start-up, brake, and low power mode) the firmware is used for direct, real-time control of the spindle current. In low power mode, the firmware can receive timing pulses based on back-EMF measurements of spindle speed. The firmware can then generate command currents for controlling spindle speed based on the timing pulses. The ROM used to store the firmware can be programmable read-only memory (PROM), or electrically erasable programmable read-only memory (EEPROM), etc, or alternatively, the firmware can be stored on a medium other than ROM, for example FLASH memory.

In other embodiments, a system for applying the method in accordance with the present invention can include an ASIC comprising a linear mode driver 212 and a spindle speed controller (not shown), wherein the spindle speed controller can modulate the current in linear mode to maintain the spindle speed at a constant desired value without requiring current commands from the microprocessor 120. As described above, the system can include ROM or other medium for storing firmware. In low power mode, the firmware creates commands for current and sends the commands to the ASIC, overriding the spindle speed controller and activating the low power mode described above. In still other embodiments, the host 122 comprises the firmware and sends the commands to the ASIC via the serial port.

In another embodiment, a method in accordance with the present invention can be used to achieve additional power savings with a switch mode driver 312, for example by increasing the limit cycle when idle and decreasing the limit cycle during read and write operations, thereby targeting the need for maximum current control. The method comprises a low power mode activated when the head 104 is idle, that is, not reading or writing to or from a medium. In low power mode, a programmable threshold for the PWM controller 362 can be increased to increase the limit cycle, thereby reducing the switch rate of the switch mode driver 312. The reduced switch rate results in lower switching losses. When the head 104 receives a command, the programmable threshold of the PWM controller 362 is decreased, decreasing the limit cycle of the switching. A system for applying the method in accordance with one embodiment of the present invention can comprise the hard disk drive 100 described above including ROM or other medium for storing firmware adapted to reprogram the programmable threshold of the PWM controller 362. In low power mode, the firmware can be used to re-program the programmable threshold of the PWM controller 362 so that the limit cycle is longer.

In still other embodiments, a method in accordance with the present invention can be used to achieve power savings in the VCM. The method can be applied to a hard disk drive 100 configured with a VCM driver 108 operating in linear mode. In the VCM, current is provided to a single voice coil, and the VCM driver 108 can have a simpler structure than that of the linear mode driver 212 for the spindle. The method comprises a low power mode activated when the head 104 is idle; that is, not reading or writing to or from the medium. In a low power mode, the microprocessor 120 commands a grossly exaggerated current from the VCM driver 108. At some time interval later, the microprocessor 120 "turns off" the VCM driver 108 by commanding zero current. The microprocessor 120 alternates between saturating and turning off the VCM driver 108 at a limit cycle. When the head 104 receives a command, the hard disk drive 100 returns to linear mode and the VCM driver 108 is commanded to a current to pivot the rotary actuator.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

The invention claimed is:

1. A system for storing and retrieving information, comprising:
   a rotatable means for storing data;
   a positioning means for positioning a head to store or retrieve data on said rotatable means;

a means for moving said positioning means;

a means for applying a voltage to said means for moving such that said positioning means moves at a design rate;

a means for selectively switching between a first voltage and a second voltage such that an approximately constant current is delivered to said means for moving; and a means for communicating with said rotatable means, wherein the means for communicating with said rotatable means is removed from communication with said rotatable means when switching between said first voltage and said second voltage.

2. A system for storing and retrieving information, comprising:

a spindle;

a disk connected with the spindle;

a head in communication with said disk;

a rotary actuator assembly connected with said head;

a voice coil motor having at least two terminals connected with the rotary actuator assembly for moving said head; and a power driver electrically connected with said voice coil motor;

wherein a first voltage potential is applied across two terminals of said voice coil motor such that said head moves at a design speed;

wherein when said head is removed from communication with said disk, said power driver switches between applying said first voltage potential and a second voltage potential across two terminals such that a constant current is delivered to said voice coil motor.

3. The method of claim 2, wherein the switching is at a rate greater than 50 kHz.

4. A system for storing and retrieving information, comprising:

a disk for storing information;

an actuator;

a head operably associated with the actuator, the head being adapted to communicate with the disk;

a voice coil motor connected with the actuator; and a power driver electrically connected with the voice coil motor;

wherein when a voltage potential is applied to the voice coil motor by the power driver the actuator pivots according to the voltage potential;

wherein when a command is received to remove the head from communication with the disk, the power driver repeatedly switches between applying a first voltage potential to the voice coil motor and a second voltage potential to the voice coil motor such that an approximately constant current is delivered to the voice coil motor.

5. The system of claim 4, wherein the power driver is a linear driver.

the first voltage potential is achieved when a first current results from substantially saturating the linear driver; and the second voltage potential is approximately zero.

6. A system for storing and retrieving information, comprising:

a disk;

an actuator having a voice coil motor for pivoting the actuator; and a head operably associated with the actuator, the head being adapted to communicate with the disk;

wherein a current applied to the voice coil motor pivots the actuator according to the current;

wherein a voltage potential switches at a switch rate between a first voltage potential and a second voltage potential such that an approximately constant current is delivered to the voice coil motor; and wherein the switch rate can vary with a desired precision of movement;

wherein when a command is received to remove the head from communication with the disk, the switch rate is reduced relative to an average switch rate.

7. The system of claim 6, further comprising a power driver electrically connected with the voice coil motor;

wherein:

the power driver is a linear driver;

the first voltage potential is achieved when a first current results from substantially saturating the linear driver; and the second voltage potential is approximately zero.

* * * * *